United States Patent Office 2,915,527
Patented Dec. 1, 1959

2,915,527

OXAZOLIDONE COMPOUNDS AND MEANS FOR PRODUCING THE SAME

Alfred Campbell, Detroit, Mich., and William Arthur Jones, Feltham, England, assignors to Parke, Davis & Company, Detroit, Mich., a corporation of Michigan No Drawing. Application April 4, 1958
Serial No. 726,322

13 Claims. (Cl. 260—307)

This invention relates to new chemical compounds and means for their production. More particularly, the invention relates to trichloromethyl oxazolid-4-one compounds having in free base form the formula,

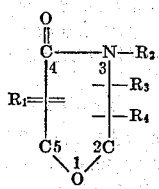

wherein $R_1$ represents the divalent combination of hydrogen and a trichloromethyl radical substituted at either the 2-position or the 5-position, $R_2$ represents hydrogen or a lower alkyl radical and $R_3$ and $R_4$ are the same or different and represent hydrogen or lower alkyl radicals substituted at either of the 2- and 5-positions not occupied by $R_1$. The term "lower alkyl" as used herein refers to alkyl radicals having from one to five carbon atoms.

In accordance with the invention, the process for the production of the mentioned oxazolid-4-one compounds comprises reacting a lactamide having the formula,

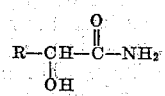

in the presence of acid catalyst with a ketone or aldehyde compound of formula, $R'=C=O$, and if desired, reacting the resulting trichloromethyl oxazolid-4-ones with a lower alkylating agent under basic conditions thereby optionally producing N-alkylated trichloromethyl oxazolid-4-one compounds; wherein R represents (1) hydrogen or a lower alkyl radical or (2) a trichloromethyl radical and R' represents the divalent combination of (1) a hydrogen radical and a trichloromethyl radical or of (2) hydrogen and/or lower alkyl radicals, respectively.

In accordance with the invention the reaction between the lactamide and ketone or aldehyde is carried out at elevated temperature preferably at the refluxing temperature of the reaction mixture. Ordinarily temperatures in the range from 55 to 150° C. will be suitable. At higher temperature there is a tendency toward decomposition thereby lowering the yield of the desired product. The reaction is generally complete within six hours and longer reaction times do not appear to favor the reaction appreciably. The relative proportion of the reactants is not critical, being subject to considerable variation. For economic reasons it is preferable, however, to employ the more readily available ketone or aldehyde compound in excess; large excesses are permissible since the latter serves in most cases as a suitable solvent for the reaction. The ketone and aldehyde reactants themselves may be employed for the reaction or they may be generated in situ by ketone- or aldehyde-forming compounds such as acetals, ketals, ethers and other similar compounds. For example, chloromethyl methyl ether may be used under the acid conditions of the reaction as a generating agent of formaldehyde. When aldehydes are required the preferred generating agent is the corresponding acetal. If desired, an inert organic solvent such as benzene, toluene or cyclohexane may be employed for the reaction. As indicated, an acid catalyst is employed. In general any strong acid will be suitable for the purpose. Some of the acid materials which are satisfactory are hydrochloric acid, sulfuric acid, p-toluene sulfonic acid, resins containing sulfonic acid groups and other similar acid materials. The concentration of the catalyst is not critical. It has been found that concentrations as low as 0.5% by weight of catalyst with respect to lactamide are sufficient to catalyze the reaction. The reaction is preferably carried out in the substantial absence of water; water formed during the reaction is preferably distilled off azeotropically as it is formed.

The trichloromethyl oxazolid-4-ones of the invention which contain an N-alkyl group, i.e., 3-alkyl group, are produced by condensing a trichloromethyl oxazolid-4-one having the formula,

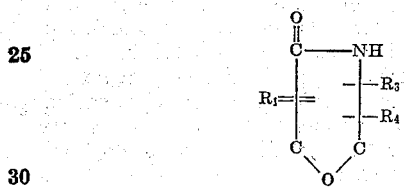

where $R_1$, $R_3$ and $R_4$ have the aforementioned significance; with a lower alkylating agent under basic conditions in accordance with alkylation methods which by themselves are known in the art. In the case of the 2-trichloromethyl-oxazolid-4-ones, this is conveniently done by heating the oxazolidone with the appropriate alkyl halide or alkyl sulfate at elevated temperature, i.e., 50° C. or higher, under alkaline conditions in the presence of a suitable solvent. The alkylation in the case of the 5-trichloromethyl-oxazolid-4-ones is carried out at low temperature, i.e., at room temperature or lower and preferably at 0° C. or lower, in the presence of an equivalent quantity of a base.

The novel compounds of the invention possess desirable properties as anti-convulsant agents of the type useful in the treatment of petit mal epilepsy. In addition the compounds of the invention in which the trichloromethyl group is in the 5-position possess pronounced hypnotic characteristics. It will be readily seen by those skilled in the art that a given product of the invention in which the aforementioned substituents $R_3$ and $R_4$ are unlike, will occur as two isomers which for convenience can be designated as alpha ($\alpha$) and beta ($\beta$) isomers. In such a case one isomer may possess considerable activity either as an anticonvulsant or as a hypnotic while the other isomer may possess a lesser activity in this respect depending upon the circumstances of each case.

The invention is illustrated by the following examples.

Example 1

(a) Thirty grams of trichlorolactamide and 150 ml. of acetone containing about 0.5 g. of hydrogen chloride gas are heated at reflux temperature for three hours. Upon evaporation of the mixture to a small volume under reduced pressure, the product separates as fine crystals and is collected by filtration. The product, 2,2-dimethyl-5-trichloromethyloxazolid-4-one, melts at 177–178° C. after recrystallization from acetone.

(b) To a rapidly stirred solution of 2:2-dimethyl-5-trichloromethyl-oxazolid-4-one (25 g.) in normal sodium hydroxide (103 ml.) prepared at 0° C., is added dimethylsulphate (13 g.), the suspension being maintained at this temperature for two hours. The crude product which separates is collected by filtration, washed thoroughly with water and crystallized once from aqueous ethanol to give pure 5-trichloromethyl-2:2:3-trimethyl-oxazolid-4-one, as colorless prisms, M.P. 101–2°.

*Example 2*

To an azeotropically dried solution of 90 g. of trichlorolactamide in 400 ml. benzene is added 100 g. of freshly distilled acetal and 0.5 g. of toluene sulfonic acid. The mixture is heated at reflux temperature and the benzene-alcohol azeotrope removed as it forms. Upon completion of the reaction, i.e., when no further azeotrope is obtained, the mixture is cooled and then washed with water. The residue is subjected to fractional distillation under reduced pressure. The fraction having a B.P. 100–130° C. at 0.01 mm. is collected and redistilled to give a mixture of the alpha and beta isomers of 2-methyl-5-trichloromethyloxazolid-4-one, as a viscous amber oil, B.P. 116° C. at 0.01 mm.

*Example 3*

To a solution of 60 g. of anhydrous trichlorolactamide, 150 ml. of toluene and 160 ml. of cyclohexane is added 50 ml. of ethylal and 0.5 g. of p-toluene sulfonic acid. The mixture is heated to reflux temperature, the cyclohexane-alcohol azeotrope being continuously removed. Upon completion of the reaction, the mixture is cooled and the product, 5-trichloromethyloxazolid-4-one, is collected by filtration and recrystallized from methyl alcohol; M.P. 229–331° C. (dec.).

This compound may be also prepared by the following route; a solution of 10 g. of anhydrous trichlorolactamide in 70 g. of chloromethyl methyl ether is refluxed for four hours under anhydrous conditions. Hydrogen chloride gas is slowly evolved and a small amount of solid separates from the mixture. After removal of the excess chloromethyl methyl ether under reduced pressure, the viscous residue is dissolved in methyl alcohol and the solution kept for approximately four days at temperatures of 0 to 5° C. The crystalline product, 5-trichloromethyloxazolid-4-one, is collected and recrystallized from methyl alcohol; M.P. 225–228° C. (dec.).

*Example 4*

Trichlorolactamide (30 g.), 18 g. of methyl ethyl ketone and 3 g. of p-toluene sulfonic acid in 150 ml. toluene are refluxed for two to three hours, the water being removed by azeotropic distillation to a water trap. The toluene and excess methyl ethyl ketone are then removed by distillation under reduced pressure. The residue is shaken with water and the crystalline product collected by filtration. The product, consisting of a mixture of the alpha and beta forms of 2-ethyl-2-methyl-5-trichloromethyloxazolid-4-one, is separated into the individual isomers by systematic fractional crystallization from methyl alcohol; the resulting alpha isomer melts at 141–143° C. and the beta isomer at 122–123° C.

*Example 5*

Trichlorolactamide (30 g.), 21.5 g. of diethyl ketone and 3 g. of p-toluene sulfonic acid in 150 ml. of toluene are refluxed for two to three hours, the water formed in the reaction being removed into a water trap. The toluene and excess ketone are then removed by distillation under reduced pressure and the residue washed with water. The product is 2,2-diethyl-5-trichloromethyloxazolid-4-one; M.P. 119–121° C. after recrystallization from methyl alcohol.

This compound can also be prepared by the above procedure using about 10 g. of a resin containing sulfonic acid groups [such as Amberlite IR–120 (H)], instead of 3 g. of p-toluene sulfonic acid.

*Example 6*

Trichlorolactamide (30 g.), 21.5 g. of methylpropyl ketone and 3 g. of p-toluene sulfonic acid in 150 ml. of toluene are refluxed for two to three hours. The toluene and excess methyl propyl ketone are then removed by distillation under reduced pressure, and the residue is washed with water and recrystallized from methyl alcohol. The resulting product, 2-methyl-2-n-propyl-5-trichloromethyloxazolid-4-one, is separated by fractional crystallization into its two isomeric forms: the α-isomer which melts at 148–149° C. and the β-isomer, at 136–7° C.

*Example 7*

Trichlorolactamide (30 g.), 21.5 g. of methylisopropyl ketone and 3 g. of p-toluene sulfonic acid in 150 ml. of toluene are refluxed for two to three hours. The toluene and excess methyl propyl ketone are then removed by distillation under reduced pressure, and the residue is washed with water and recrystallized from methyl alcohol. The resulting product, 2-methyl-2-isopropyl-5-trichloromethyloxazolid-4-one, is separated by fractional crystallization into its two isomeric forms: the α-isomer which melts at 169–171° C. and the β-isomer, at 138–141° C.

*Example 8*

Trichlorolactamide (30 g.), 25 g. of butyl-methyl ketone and 3 g. of p-toluene sulfonic acid in 150 ml. of toluene are refluxed from two to three hours. The toluene and excess ketone are removed by distillation under reduced pressure and the residue is shaken with water before recrystallization from methyl alcohol. The resulting product is 2-n-butyl-2-methyl-5-trichloromethyl-oxazolid-4-one; M.P. 92–97° C. The product can be fractionally recrystallized from methyl alcohol to provide the α-isomer, M.P. 133–134° C., and the β-isomer, M.P. 101–102° C.

*Example 9*

A stirred suspension of 30 g. of glcolamide, 3 g. of p-toluene sulfonic acid and 60 g. of anhydrous chloral in 500 mm. of toluene is heated at reflux temperature for six hours. Water which is evolved is collected in a water trap. The reaction mixture while hot is decanted from any insoluble sediment and allowed to cool. The product, 2-trichloromethyloxazolid-4-one, crystallizes from the mixture and is collected by filtration. After rinsing with 100 ml. of toluene and recrystallizing from ethyl alcohol the product melts at 184–185° C.

The product may be converted to the corresponding 3-methyl derivative as follows: a mixture consisting of 16 g. of methyl iodide, 20 g. of 2-trichloromethyloxazolid-4-one and 14 g. of anyhydrous potassium carbonate in 500 ml. of acetone is refluxed for three hours. After filtration the acetone is removed and the residue washed with water and recrystallized from light petroleum (B.P. 60–80°). The resulting product is 3-methyl-2-trichloromethyloxazolid-4-one, M.P. 100° C.

The corresponding 3-ethyl derivative can be prepared as follows: a mixture consisting of 12 g. of ethyl bromide, 20 g. of 2-trichloromethyloxazolid-4-one and 6.8 g. of sodium ethoxide in 500 ml. of absolute alcohol is refluxed for three hours. Most of the solvent is removed by distillation and the residue is washed with water. This residue is recrystallized from light petroleum (B.P. 60–80°) to give 3-ethyl-2-trichloromethyloxazolid-4-one; M.P. 59–60° C.

*Example 10*

A stirred suspension of 30 g. of lactamide, 60 g. of anhydrous chloral and 3 g. of p-toluene sulfonic acid in 500 ml. of toluene is heated at reflux temperature for six hours during which time water is collected in a water trap. The reaction mixture is then decanted from any insoluble residue and the toluene is removed by distillation under reduced pressure. The residue is shaken with 200 ml. of water and allowed to stand for about twenty hours following which the resulting magma is thinned slightly with methyl alcohol and filtered. The crystalline product is fractionally recrystallized from methyl alcohol to give a α-5-methyl-2-trichloromethyl-oxazolid-4-one; M.P. 182–183° C., and β-5-methyl-2-trichloromethyloxazolid-4-one; M.P. 140–148° C.

The above compounds may be prepared by the same technique described above except that 500 ml. of benzene is used instead of 500 ml. of toluene. The alpha isomer in this instance has a melting point of 182–183° C. while the beta isomer has a melting point of 156–157° C. Mixed melting points of this low melting isomer with the one described in the preceding paragraph indicate they are one and the same compound.

The corresponding 3-methyl and 3-ethyl derivatives can be prepared as follows: a stirred suspension of 16 g. of methyl iodide, 21 g. of 5-methyl-2-trichloromethyl-oxazolid-4-one, 15 g. of anhydrous potassium carbonate and 500 ml. of acetone is refluxed for three hours. Most of the acetone is removed by distillation. A solution of the residue in ether is washed with water, dried and subjected to vacuum distillation. The product is 3,5-dimethyl-2-trichloromethyloxazolid-4-one; B.P. 80° C. at 0.5 mm.

A mixture consisting of 12 g. of ethyl bromide, 21 g. of 5-methyl-2-trichloromethyloxazolid-4-one and 7 g. of sodium ethoxide and 500 ml. of absolute alcohol is heated at reflux temperature for five hours. The solvent is removed by vacuum distillation, the residue dissolved in ether, washed with water, dried and then subjected to vacuum distillation. The product is 3-ethyl-5-methyl-2-trichloromethyloxazolid-4-one; B.P. 96° C. at 0.5 mm.

*Example 11*

To an azeotropically dried solution of 90 g. trichlorolactamide in 400 ml. of benzene is added 62 g. of propionaldehyde diethyl acetal and 0.5 g. of p-toluene sulfonic acid. The suspension is heated at reflux temperature under a 12″ column of Fenski helices. The benzene-alcohol azeotrope which separates is continuously removed until the reaction is completed. The cooled mixture is then twice washed with 100 ml. of water before fractional distillation under reduced pressure. The fraction having a boiling point of 100–101° C. at 0.005 mm. is 2-ethyl-5-trichloromethyloxazolid-4-one.

*Example 12*

To a dried solution of 90 g. of trichlorolactamide and 400 ml. of benzene is added 68 g. of freshly distilled butyraldehyde diethyl acetal and 0.5 g. of p-toluene sulfonic acid. The reaction mixture is heated at reflux temperature under a 12″ column of Fenski helices; the benzene alcohol azetrope which separates is continuously removed until the reaction is completed. The cooled mixture is then washed twice with 100 ml. of water before fractional distillation under reduced pressure. The viscous yellow oil having a boiling point of 111–112° at 0.01 mm. is 2-n-propyl-5-trichloromethyloxazolid-4-one.

The compounds of the invention which are preferred as hypnotic agents are the 5-trichloromethyloxazolid-4-ones which contain two lower alkyl groups in the 2-position: in particular, the 2,2-dimethyl-, 2-methyl-2-ethyl-, 2,2-diethyl-2-methyl-2-n-butyl-, and 2-methyl-2-n-propyl-, and 2-methyl-2-isopropyl - 5 - trichloromethyloxazolid-4-ones. As anticonvulsant agents, 2-trichloromethyloxazolid-4-one and 3-methyl-2-trichloromethyloxazolid-4-one possess especially outstanding activity and are free from undesirable side affects.

While the foregoing specification describes the present invention in considerable detail it will be realized by those skilled in the art that substantial variation can be made in such detail without departing from the spirit of the invention.

We claim:
1. Oxazolidone compounds having the formula

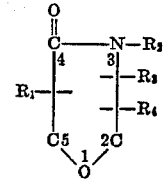

wherein $R_1$ represents a member of the class consisting of 2-trichloromethyl and 5-trichloromethyl radicals, $R_2$ represents a member of the group consisting of hydrogen and alkyl radicals containing from 1 to 5 carbon atoms, and $R_3$ and $R_4$ each represent a member of the group consisting of hydrogen and alkyl radicals containing from 1 to 5 carbon atoms, said $R_3$ and $R_4$ being substituted at one of the 2- and 5-positions not substituted by $R_1$.

2. 2,2-dimethyl-5-trichloromethyloxazolid-4-one.
3. 2-methyl-2-ethyl-5-trichloromethyloxazolid-4-one.
4. 2,2-diethyl-5-trichloromethyloxazolid-4-one.
5. 2-methyl-2-n-butyl-5 - trichloromethyloxazolid - 4-one.
6. 2-methyl-2-n-propyl - 5 - trichloromethyloxazolid-4-one.
7. 2-methyl-2-isopropyl-5-trichloromethyloxazolid - 4-one.
8. 2-trichloromethyloxazolid-4-one.
9. 3-methyl-2-trichloromethyloxazolid-4-one.
10. Process for the production of trichloromethyloxazolid-4-one compounds which comprises reacting trichlorolactamide in the presence of acid catalyst with a compound of formula

where R′ is a divalent combination selected from the group consisting of (1) dihydro, (2) hydrogen and an alkyl radical containing 1 to 5 carbon atoms, and (3) dialkyl each alkyl radical containing 1 to 5 carbon atoms.

11. Process according to claim 10 wherein the reaction is carried out at temperatures in the range from 55 to 150° C.

12. Process according to claim 10 wherein trichlorolactamide is reacted with a dialkyl ketone.

13. Process according to claim 10 wherein the resulting trichloromethyloxazolid-4-one compound is reacted with a lower alkylating agent in the presence of a basic medium thereby providing the corresponding 3-(lower alkyl)trichloromethyloxazolid-4-one compound.

No references cited.